United States Patent

Roberts et al.

Patent Number: 6,114,031
Date of Patent: Sep. 5, 2000

[54] POLARIZED FILMS FROM PAIRWISE-DEPOSITED SEMI-IONOMERIC SYNDIOREGIC POLYMERS

[75] Inventors: Marion J. Roberts; John D. Stenger-Smith, both of Ridgecrest, Calif.; Kenneth J. Wynne, Falls Church, Va.; Peter Zarras, Ridgecrest, Calif.; Andrew P. Chafin, Ridgecrest, Calif.; Richard A. Hollins, Ridgecrest, Calif.; Geoffrey A. Lindsay, Ridgecrest, Calif.

[73] Assignee: The United States of America as represented by the Secretary of the Navy, Washington, D.C.

[21] Appl. No.: 09/246,197

[22] Filed: Jan. 11, 1999

Related U.S. Application Data

[62] Division of application No. 08/800,943, Jan. 23, 1997, Pat. No. 5,882,785.

[51] Int. Cl.[7] ..................................................... B05D 1/20
[52] U.S. Cl. ..................... 428/333; 428/411.1; 427/162; 427/169; 427/407.2; 427/430.1; 427/434.3
[58] Field of Search ............................. 428/333, 1, 411.1, 428/474.7; 349/183; 427/162, 169, 407.2, 430.1, 434.3

[56] References Cited

U.S. PATENT DOCUMENTS

5,208,111  5/1993  Decher et al. ........................ 428/420
5,247,005  9/1993  Strenger-Smith et al. ............. 528/310

*Primary Examiner*—Paul Thibodeau
*Assistant Examiner*—D. Lawrence Tarazano
*Attorney, Agent, or Firm*—Gregory M. Bokar; Anthony J. Serventi

[57] ABSTRACT

This invention is comprised of new nonlinear optic polymers and a new Langmuir-Blodgett (LB) film deposition scheme for which these polymers were designed. The invention is unique because it produces an electro-optic film which has never undergone electric-field poling nor high temperature treatment. It eliminates the dilution effect of the long hydrophobic alkyl groups, and creates stronger ionic bonds between the polymer chains. Finally, the invention reduces the time to make a film of a given thickness by at least half by virtue of depositing two polymer layers per stroke. The new polymers are comprised of asymmetric chromophores linked head-to-head by alternating two different kinds of bridging groups. One of the bridging groups contains one or more ionic groups, and the other bridging group contains one or more non-ionic, hydrophilic groups.

16 Claims, 4 Drawing Sheets

Typical ionic nonlinear optical polymers of this invention.

Figure 1. Typical ionic nonlinear optical polymers of this invention.

SUBSTRATE LB TROUGH

STEP 1; THE LB TROUGH IS FILLED WITH AQUEOUS 0.001m POLYANION. THE SUBSTRATE IS POSITIONED AT THE BOTTOM OF ITS STROKE AND THE BARRIERS ARE FULLY OPEN.

FIG. 2A

STEP 2; A 0.5 M ORGANIC SOLUTION OR WATER-INSOLUBLE POLYCATION IS PLACED DROPWISE ON THE LIQUID SURFACE AND THE SOLVENT IS ALLOWED TO EVAPORATE. THE POLYANION IONICALLY BONDS WITH THE POLYCATION AT THE ARGON/LIQUID INTERFACE.

FIG. 2B

STEP 3; THE POLYCATION/POLYANION BILAYER IS COMPRESSED LATERALLY. ONCE THE TARGET SURFACE PRESSURE IS REACHED ONE BILAYER IS DEPOSITED AS THE SUBSTRATE IS MOVED UPWARD TO THE TOP OF ITS STROKE.

FIG. 2C

STEP 4; THE LATERAL PRESSURE ON THE BILAYER IS RELEASED. THE SUBSTRATE IS REPOSITIONED AT THE BOTTOM OF ITS STROKE AND THE DIPPING CYCLE IS REPEATED BEGINNING WITH STEP 1.

FIG. 2D

Figure 4. Synthetic scheme used to make a typical nonlinear optical polymer F of this invention.

POLARIZED FILMS FROM PAIRWISE-DEPOSITED SEMI-IONOMERIC SYNDIOREGIC POLYMERS

CROSS-REFERENCE TO RELATED APPLICATION

This application is being filed as a Divisional application in accordance with 37 C.F.R. 1.53(b). The Parent application of this Divisional application is application Ser. No. 08/800,943 filed Jan. 23, 1997, U.S. Pat. No. 5,882,785.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

This invention relates generally to organic polymeric thin films for photonic applications. Specifically, the invention focuses on the process for making second-order nonlinear optical polymeric (hereinafter, NLOP) films.

2. Description of the Prior Art

The following information is provided as a brief overview of technology relevant to this invention. For a more detailed discussion involving this technology please refer to U.S. Pat. No. 5,247,055 issued Sep. 21, 1993 to Stenger-Smith et al., U.S. Pat. No. 5,520,968, issued May 28, 1996 to Wynne et al., and the book, Polymers for Second-Order Nonlinear Optics, G. A. Lindsay and K. D. Singer, Eds., Am. Chem. Soc. Advances in Chemistry Series 601, Washington, D.C., 1995.

Organic polymeric thin films for photonic applications has been a rapidly evolving area of research for over ten years. One class of materials within this field, NLOP films, has potential for breakthroughs in low cost integrated devices for the telecommunication and data-communication industries. Key components of this new technology are electro-optic (EO) waveguides made from second-order nonlinear optical polymer films. These waveguides have the potential to switch optical signals from one path to another and also to modulate the phase or amplitude of an optical signal.

The molecular origin of optical nonlinearity derives from the electrical polarization of the chromophore as it interacts with electromagnetic radiation. The molecular structure of the chromophore and its orientation govern the nonlinear optical properties of the system. Furthermore, it is the polymer structure that dictates the processability and temporal stability of the final product.

In order for films to have a large NLO coefficient, they must contain a high concentration of asymmetrical, highly polarizable chromophores arranged in a highly polarized configuration. In the past few years, several types of polymers have been developed which are effective in EO modulation of optical signals.

As previously noted, the polymer structure dictates the processability and temporal stability of the final product. Chromophores in the polymers are usually aligned by electric field poling near the glass transition temperature. When the film is cooled, alignment of the chromophores is frozen in the desired position.

Guest-host systems:

This class (guest-host systems) of nonlinear optical polymers consists of small molecular, asymmetric chromophores dissolved in glassy polymers. These solid solutions typically contain small molecular chromophores dissolved in high molecular weight polymers. Guest-host systems typically contain 10–20% by weight of the chromophore. A drawback of guest-host materials is the fact that the glass transition temperature of the polymer decreases due to plasticization by the chromophore. In addition, chromophores in guest-host systems are to some degree labile (they diffuse to the surface of the film and may evaporate at elevated temperature). Chromophores on the surface of guest-host films can be absorbed through the skin. These chromophores are often toxic, mutagenic, teratogenic and carcinogenic. By attaching these chromophores to a high molecular weight polymer, which cannot be absorbed through the skin, the health hazards are greatly minimized.

In spite of these limitations, guest-host systems may have practical applications if the polymer selected has a high glass transition temperature (>250° C.) and a large chromophore is utilized.

Sidechain Polymers:

Sidechain polymers consist of asymmetric chromophores chemically attached at one point pendant to the backbone of the polymer. For example, the attachment occurs at the electron accepting end or at the electron donating end of the chromophore. Compared to guest-host systems, sidechain polymers have a much greater temporal stability at a given glass transition temperature and for a given chromophore.

Mainchain Polymers:

In mainchain polymers the chromophores are chemically attached (linked) at both ends resulting in the majority of the chromophore forming part of the backbone. The unique characteristic of this class of polymers is that the asymmetric chromophores can be linked in a head-to-tail pattern (isoregic), head-to-head pattern (syndioregic), or in a random head-to-head and head-to-tail (aregic) pattern. Because chromophores in mainchain polymers are linked at both ends in one of these three types of patterns, the chromophores have one less degree of freedom of motion relative to sidechain polymers. Therefore, mainchain chromophoric topology is, in principle, more stable than sidechain chromophoric topology.

Polar Order:

Second-order nonlinear optical properties require that the chromophore orientation in the film is noncentrosymmetric. Two primary techniques used to impart polar order in the film are elevated temperature electric-field poling and room temperature Langmuir-Blodgett processing. Recently, photopoling has been utilized for imparting polar order at room temperature for azo-containing chromophores.

Stability:

There are a number of different types of stability relevant to asymmetrical chromophores. Physical stability refers to the stability of the polar chromophore alignment to relaxation into a nonpolar state. Chemical stability refers to the integrity of the chemical structure of the chromophore, for example, against oxidation or hydrolysis. Photochemical stability refers to the stability of the chromophore to irradiation by light, especially in the presence of oxygen and water. Temporal stability refers to how well the physical, photochemical and chemical stability are maintained at a given temperature. Finally, processing stability refers to how well the polymer handles film processing procedures and various packaging operations. All of the above types of stability are critical if long term optical stability is to be achieved.

Electric-Field Poling:

Thin polymer films are prepared for poling by spin-coating a liquid solution of the polymer (about a 10 to 30% concentration) onto a solid substrate. The solvent is removed by baking the film just above the glass transition temperature (Tg). After baking, an electric field is applied across the film in one of two ways:

1) By corona poling the film on a grounded conductor plane near the film's Tg for 1 to 150 minutes.
2) By charging two electrodes contacting the film heated to Tg for 1 to 150 minutes. Either of these processes can create an electric field of fifty to several hundred volts/micron across the film. The film is then cooled with the field on. After the external field is removed, a net alignment of dipole moments can remain locked in the film for long periods of time, providing that the temperature of the film remains well below any solid state transition, such as the Tg.

There are several problems associated with electric-field poling. First, the polymer utilized must be heated to high temperatures. At these high temperatures thermal disordering of the chromophores works against the torque of the electric field resulting in the chromophores being less well ordered. In addition, polymers containing formal charges are very difficult to pole with an electric field because the charges tend to migrate through the polymer causing dielectric breakdown (i.e. shorting out the electrode).

Langmuir-Blodgett (LB) Processing:

In conventional LB processing, the polymer molecules are designed to have hydrophilic and hydrophobic groups which cause the polymer to float on the gas-liquid interface in a preferred confirmation. These hydrophilic/hydrophobic forces are useful in removing the centrosymmetry by orienting the chromophores normal to the plane of the film.

To make films by LB processing, an organic compound is floated on a liquid, eg. water, ethylene glycol or other aqueous solutions, in a trough. A solid substrate is dipped through the gas-liquid interface depositing a single molecular layer on the substrate. Thicker films comprised of multilayers of polymers are built up by repeatedly dipping the substrate into and/or out of the trough, depositing one layer per stroke.

One of the main advantages that conventional LB processing has over electric-field poling is that LB processing may be carried out at room temperature (or lower). Furthermore, unlike electric field poling, formal ionic charges on the polymer need not hinder the ordering process.

Previous materials utilizing the LB methodology for the fabrication of waveguides (U.S. Pat. No. 5,162,453 issued Nov. 10, 1992 to Hall et al., U.S. Pat. No. 5,225,285 issued Jul. 6, 1993 to Hall et al., U.S. Pat. No. 4,830,952 issued May 16, 1989 to Penner et al, and U.S. Pat. No. 4,792,208 issued Dec. 20, 1988 to Ulman et al.) have suffered from thermal instability due to the presence of low melting alkyl and fluoroalkyl hydrophobic chains. One strategy to increase the thermal stability of LB films is the use of interlayer and/or intralayer covalent bonding (i.e. crosslinking). Another strategy is to attach chromophores to rigid polymer backbones. However, attaching sidechain chromophores to polyimides [Please refer to the following articles for more information on this subject: Thin Solid Films, 244 (1994) 754–757, and Langmuir, 10 (1994) 1160–1163] failed to provide stable multilayer NLOP films.

A limitation of LB technology is the amount of time required to build up films of sufficient thickness (>0.5 micrometers) for waveguiding. Two ways that the rate of deposition can be increased on the substrate without sacrificing film quality are:

1) Lowering monolayer viscosity by use of higher subphase temperatures, choice of subphase ions, or change of pH. [Please refer to the following for more information on this subject, "Insoluble Monolayers at Liquid-Gas Interfaces" G. L. Gaines, Interscience Publishers, New York, 1966.]
2) Utilizing alternative monolayer compression schemes such as the flowing subphase [Please refer to the following for more information on this subject, Advanced Materials 1991, 3(1), 25–31].

As mentioned earlier, the classical LB processing technique requires that the material self-assemble into noncentrosymmetric order at an interface between gas and aqueous liquid through a balance of hydrophobicity and hydrophilicity. Typically, by design, functional groups are introduced into the polymer chemical structure to bring about preferential chromophore orientation. These functional groups, especially the alkyl groups which are used for hydrophobicity, lead to a lowering of the Tg and a dilution of the concentration of chromophores. Dilution causes a lowering of the nonlinear optical coefficient of the waveguide.

This invention is unique for a number of reasons:
1) It eliminates the entire electric-field poling step.
2) It eliminates the dilution effect of the hydrophobic alkyl groups.
3) It creates stronger ionic bonds between the polymer chains.
4) It can double the rate of making films of a given thickness and of a given NLO coefficient compared to prior LB art.

BRIEF SUMMARY OF THE INVENTION

One object of this invention is to eliminate the entire electric-field poling step. In addition, another object of the invention is to produce new ionic nonlinear optic polymers comprised of asymmetric chromophores linked head-to-head by bridging groups. Furthermore, another object of the invention is to eliminate the dilution effect of the hydrophobic alkyl groups and to create stronger ionic bonds between the polymer chains.

The polarized film has a microstructure consisting of a stack of a semi-ionomeric syndioregic accordion polymer paired with a complementary ionic compound having essentially no nonlinear optical properties. The accordion polymers are comprised of chromophores linked head-to-head and tail-to-tail (i.e., syndioregically, as described in U.S. Pat. Nos. 5,247,055 and 5,520,968) and contain special ionic bridging groups which are part of the present invention. The chromophores are asymmetric, with one end being electron-accepting and the other end being electron-donating. A semi-ionomeric syndioregic accordion polymer has an ionic group(s) on every other bridging group. This type of accordion polymer is contrasted to a fully ionomeric syndioregic accordion polymer that has an ionic group(s) on every bridging group. In this invention, one type of semi-ionomeric polymer, F, is paired with one complementary ionic compound, S, having the opposite charge. "Complementary" is defined as both F and S having characteristics that facilitate the new method of this invention (described below) for forming a polar film in which the ionic groups in F bond with the ionic groups in S to form a stable polymeric bilayer salt.

Figure 1:
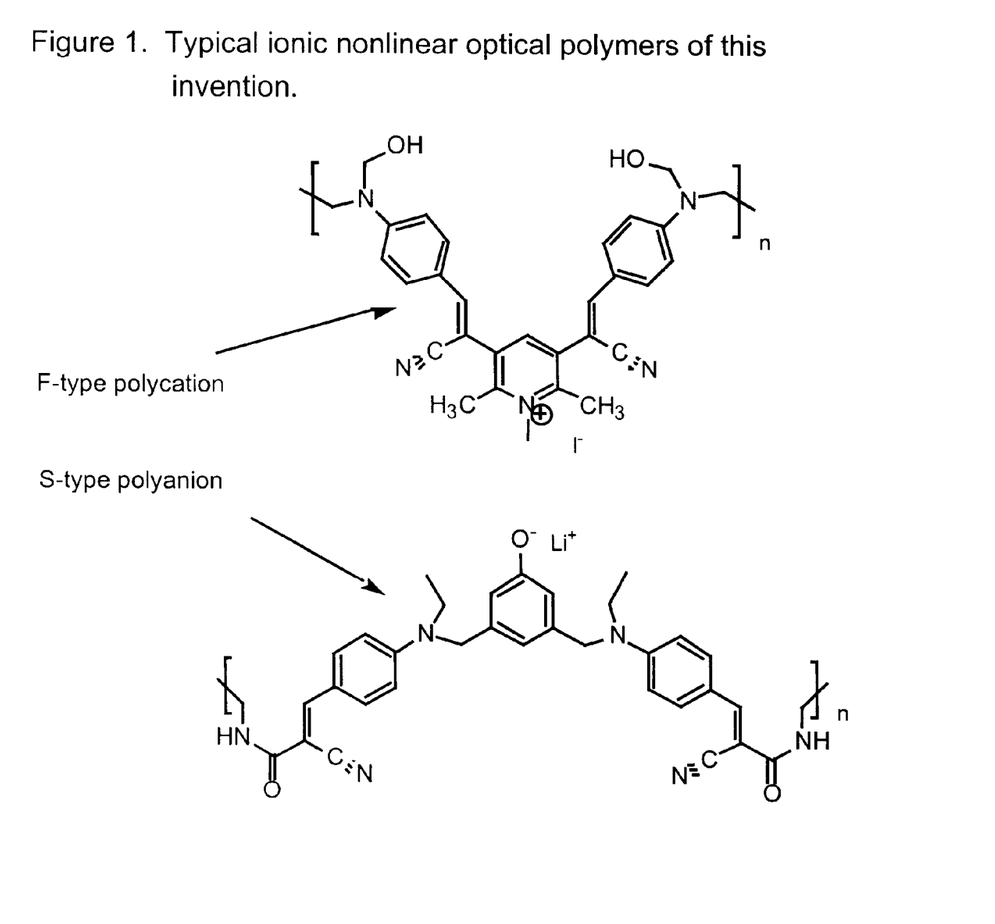
FIG. 1: Schematic representation of typical ionic nonlinear optical polymers of this invention

The F of this invention is designed to be essentially insoluble in the subphase liquid in a LB trough typically an aqueous medium, and is designed to have the opposite ionic charge to that charge associated with the S which is designed to be soluble in the same liquid sub phase. The complementary pair bring their ions in close enough proximity to form a bilayer polymeric salt, F/S, at the liquid-gas interface. The bridging groups are also designed to allow the polymer backbone to fold so that the chromophores can easily lie with their long geometric axes at non-zero angles with respect to the plane of the film. FIG. 1 illustrates this configuration.

Another object of this invention is the method of pairwise deposition of [F/S] on a solid substrate to form a polarized film. In a Langmuir-Blodgett (LB) trough one complementary polymer, an S, is completely dissolved in the liquid subphase medium. The other complementary polymer, an F, is floated on the liquid subphase, typically an aqueous solution. The F is essentially insoluble in the subphase. An organic solution of the F is spread on the gas side of the liquid subphase surface, and the organic solvent evaporates into the gas or dissolves into the subphase. The liquid phase is typically aqueous and the gas utilized is typically argon to prevent oxidation of the chromophores.

The LB trough is equipped with a movable barrier(s) partially submerged in the subphase. The movable barrier is used to decrease the area occupied by the floating Langmuir layer in effect laterally compressing the layer which forces the chromophores to arrange in an orientation approaching perpendicular to the plane of the gas/liquid interface. The surface pressure at the gas-liquid interface is first increased then held constant at a value between 20% and 90% of the minimum pressure required to collapse the film at the gas-liquid interface. A solid substrate is dipped through the gas-liquid interface depositing an [FS] bilayer on the solid substrate (pair-wise deposition). The solid substrate can be oriented from 0° to 90° with respect to the surface of the gas-liquid interface, and is repeatedly dipped through the aqueous-gas interface by the Z-type or X-type deposition procedure [Please refer to U.S. Pat. No. 5,247,055 for more information regarding Z- and X-type deposition procedures] until a multilayer film comprised of from about 1 to 4000 bilayers is achieved.

For device applications wherein the polymer film is subjected to electric fields, the NLO inactive cation or NLO inactive anion must not contribute to ionic conductivity.

The film comprised of bilayers vertically stacked one upon another is represented by $[F/S]_n$, where n is the number of bilayers. A four-bilayer film representation is shown here for example:

DETAILED DESCRIPTION OF THE INVENTION

One embodiment of this invention, see Diagram 1 below, is a polarized film consisting of at least one pair of materials (a molecular bilayer), comprising two monolayers, one of which is a semi-ionic, head-to-head, mainchain, chromophoric accordion polymer, F, and the other is an ionic material of the opposite charge, S. The F polymer, during the fabrication of the film, floats on a liquid subphase of a Langmuir-Blodgett trough, and is essentially insoluble in the subphase. The S material is soluble in the subphase. See Diagram #1 below:

This polarized film, comprises one to 4000 vertically stacked molecular bilayers having the formula wherein:

n is the number of bilayers;

F is a semi-ionic mainchain, head-to-head chromophoric polymer which is represented by the formula:

which floats on a liquid subphase of a Langmuir-Blodgett trough and is essentially insoluble in said subphase during the film deposition process;

S is an ionic compound having essentially no nonlinear optical properties and having the opposite charge of F, and said S is soluble in said subphase;

$B_{NFD}$ is a nonionic bridging group, extending between and being part of said electron donating ends of two $C_F$ chromophores;

$B_{IFA}$ is an ionic bridging group, extending between and being part of said electron accepting ends of two $C_F$ chromophores;

$C_F$ chromophores have an electron accepting group at one end (nearest $B_{IFA}$), and an electron donating group at the other end (nearest $B_{NFD}$), and a rigid group which contains delocalized p-electrons electronically connecting the electron accepting end and the electron donating end of said chromophores;

$y_F$ is the degree of polymerization of F, which ranges from a minimum value of 2 to a maximum value of about 300.

Another embodiment of this invention is a polarized film consisting of at least one pair of materials (a molecular bilayer), in which the polar axis of the chromophores is pointing in the opposite direction relative to the film shown in Diagram 1. This film consists of at least one bilayer, comprising a monolayer of semi-ionic, head-to-head, mainchain, chromophoric accordion polymer, F', which is ionically bonded to S. S is an ionic molecule having essentially no nonlinear optical properties and having the opposite charge of F', and said S is soluble in said subphase. One of the molecular layers is formed of F', which during the fabrication of the film, floats on a liquid subphase of a Langmuir-Blodgett trough, and is essentially insoluble in the subphase. The other molecular layer is formed of S which is soluble in the subphase. Both polymers F' and S are ionic, one having the opposite charge of the other. See Diagram #2 below:

wherein n is one to 4000 vertically stacked molecular bilayers, F' is an ionic mainchain, head-to-head chromophoric polymer which is represented by the formula:

which during the manufacture of the film, floats on a liquid subphase of a Langmuir-Blodgett trough and is essentially insoluble in said subphase;

S is an ionic molecule having essentially no nonlinear optical properties and having the opposite charge of F', and said S is soluble in said subphase;

$B_{NFA}$ is a nonionic bridging group, extending between and being part of said electron accepting ends of two $C_F$ chromophores;

$B_{IFD}$ is an ionic bridging group, extending between and being part of said electron donating ends of two $C_F$ chromophores;

$C_F$ is a chromophore of F', and wherein, said chromophore has an electron accepting group at one end (nearest $N_{NFA}$), and an electron donating group at the other end (nearest $N_{IFD}$), and a rigid group which contains delocalized p-electrons electronically connecting the electron accepting end and the electron donating end of said chromophores;

$y_F$ is the degree of polymerization of F', which ranges from a minimum value of 2 to a maximum value of about 300.

The cationic electron-accepting bridging groups ($B_{IFA}$) in polymer F, can be independently selected from the group consisting of:

-continued

-continued in which:
* designates a point of attachment between the bridging group and a rigid connecting group;
R is methyl, ethyl, propyl, hydroxyethyl, or benzyl;
$R_1$ is hydrogen, methyl, ethyl, propyl, or allyl; and n and m are independently 2 or 3.

For the cationic polymers F and F' and compounds S and S', the counter ions can be any common monovalent anion such as chloride, bromide or tosylate. For the anionic polymers F and F', and the compounds S and S', the counter ions can be any common monovalent cation such as lithium, sodium or ammonium.

The nonionic electron-donating bridging groups ($B_{NFD}$) in polymer F can be independently selected from the group consisting of:

in which:
* designates a point of attachment between the bridging group and a rigid connecting group;
R is methyl, ethyl, propyl, allyl, hydroxyethyl, or benzyl; and $R_2$ is hydrogen, hydroxyl, methoxyl, ethoxyl, acrylate, methacrylate, or oxohydroxyethyl.

The nonionic electron-accepting bridging groups ($B_{NFA}$) in polymer F' can be selected from the group consisting of:

in which:
* designates a point of attachment between the bridging group and a rigid connecting group;
R is hydrogen, methyl, ethyl, propyl, allyl, hydroxymethyl, hydroxyethyl, or benzyl; and
$R_2$ is hydrogen, hydroxyl, methoxyl, ethoxyl, acrylate, methacrylate, or oxohydroxyethyl.

The anionic electron-donating bridging groups ($B_{IFD}$) in polymer F' can be selected from the group consisting of:

-continued in which:
* designates a point of attachment between the bridging group and a rigid connecting group; R is methyl, ethyl, propyl, allyl, hydroxyethyl, or benzyl; X is selected from the group consisting of sulphonate $(SO_3)^-$, carboxylate $(CO_2)^-$ and phosphonate $(PO_4)^{2-}$; and n is 2 or 3.

The cationic electron-donating bridging groups (BED) in polymer F' can be selected from the group consisting of:

in which:
* designates a point of attachment between the bridging group and a rigid connecting group;
R is methyl, ethyl, propyl, hydroxyethyl, or benzyl; and n is 2 or 3.

The anionic electron-accepting bridging groups ($B_{IFA}$) in polymer F can be independently selected from the group consisting of:

-continued in which:
* designates a point of attachment between the bridging group and a rigid connecting group;

R is hydrogen, methyl, ethyl, propyl, allyl, hydroxyethyl, or benzyl;

$R_1$ is hydrogen or methyl;

X is selected from the group consisting of sulphonate $(SO_3)^-$, carboxylate $(CO_2)^-$ and phosphate $(PO_4)^{2-}$; and n is 2 or 3.

The rigid connecting groups of the chromophore, $C_F$, are independently selected from the group consisting of:

-continued

-continued in which:

* designates a point of attachment between the bridging group and a rigid connecting group; and Z can be independently chosen from thio ether (S), ether (O), or an amine (NH). The following examples are provided to further illustrate this invention.

EXAMPLE 1

The following illustrates the synthesis of Polymer F. Please refer to FIG. 4 for the schematic.

Polymerization of compound C with compound D to give Polymer NF (the neutral form of Polymer F):

A 50 mL round bottom flask was charged with 0.15 g (0.81 mmol) of compound D and 0.29 g (0.81 mmol) of compound C [bis (p-xylyl ethanolaminoaldehyde)] dissolved in 7 mL of dry pyridine. A catalytic amount (5 drops) of piperidine was added and the mixture was kept at 125° C. for 4.5 days under positive nitrogen pressure. The solution was cooled then added drop-wise into an excess of methanol (about 200 mL) and the precipitated polymer was filtered, dried to yield 0.3 g (80%) of a yellow powder. Polymer NF (The neutral form of Polymer F) $^1$H NMR and $^{13}$C NMR confirmed the product was obtained. The average molecular weight was determined to be 4175 g/mol (Dp=8). Thermal analysis showed the Tg was 173.0° C. and the Td (2 wt. % loss) was 330° C.

Methylation of Polymer NF to give polymer F:

A 10 mL round bottom flask was charged with 3.0 mL of dimethylsulfoxide, 90 mg (0.2 mmol) of Polymer NF and 26.7 mg (0.2 mmol) of iodomethane. The solution was stirred at ambient temperature for 3 days under nitrogen. The solution was added drop-wise to diethylethers (about 75 mL) and a brown oil precipitated from the ethereal solution. The ethereal solution was decanted and the brown oil dried to yield a brown glassy powder (80 mg, 72%, Polymer F). $^1$H NMR showed the product was 75% methylated to the pyridinium accordion ionomer.

EXAMPLE 2

Films were made using a rectangular Langmuir-Blodgett (LB) minitrough (NIMA, Coventry). The trough was kept in a glove bag (Aldrich, Milwaukee) with argon gas at a temperature of 24° C. during the bilayer depositions. The substrates were glass slides (Fisher, Catalogue #12-550A) cut to 1.5 cm×2.5 cm and cleaned with a solution consisting of 30% $H_2O_2$ in concentrated $H_2SO_4$. For dipping, 2 substrates were clamped back-to-back so that material was deposited on one side of each substrate. Under argon, a 0.026M solution of Polymer S in dimethylsulfoxide was diluted to $10^{-4}$ anionic repeat units per liter of solution with water from a Barnstead Nanopure water purification system (17.9 Mohms resistivity, 0.2 micron filter). The trough was filled with the $10^{-4}$M solution of compound S (pH 5.5). A chloroform/pyridine (3:1) solution of Polymer F was spread at the argon/aqueous solution interface. The system was allowed to equilibrate for 1 hour before the polymer bilayer was compressed symmetrically at a barrier speed of 10 $cm^2$/min at a surface pressure of 15 mN/m.

The deposition procedure took place as follows, as illustrated in FIGS. 2A through 2D. The substrates were held at the bottom of the dipstroke during the equilibration and initial compression of the bilayer. Once the system reached the target surface pressure of 15 mN/m, the substrates were moved on the upstroke at 1.5 mm/min. When the substrates reached the top of the stroke, the barriers were moved back at maximum speed until the surface pressure was approximately 0 mN/m. The substrates were then moved on the downstroke at 100 nm/min to minimize the transfer of material. Subsequent bilayers were built up on the substrates by repeating this deposition procedure until a target thickness of 4 bilayers was achieved.

Figure 2A:
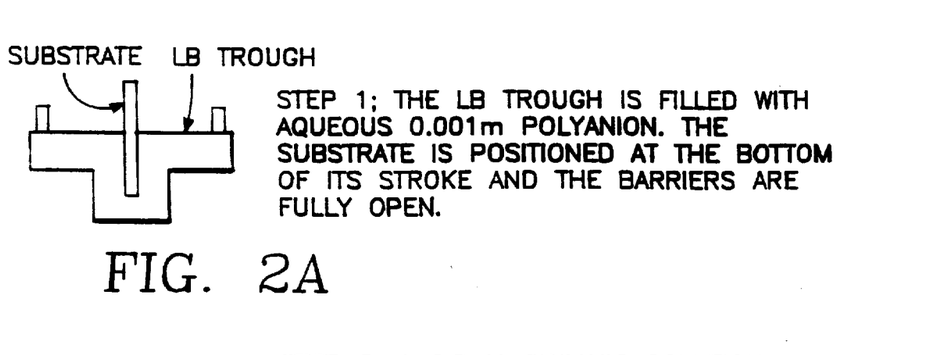
FIG. 2: Schematic representation of a block diagram of the Langmuir-Blodgett film deposition cycle utilized in this invention.
Figure 2B:
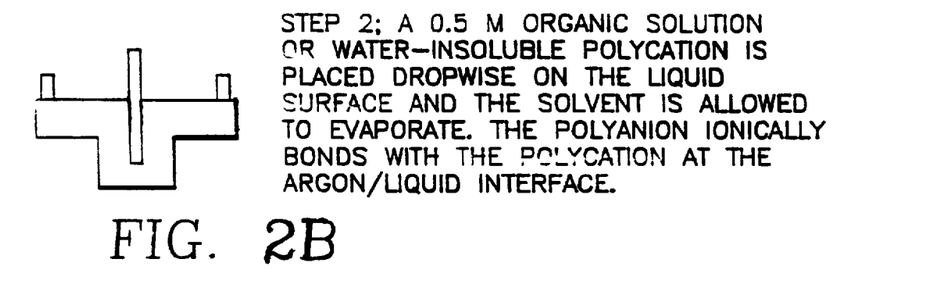
Figure 2C:
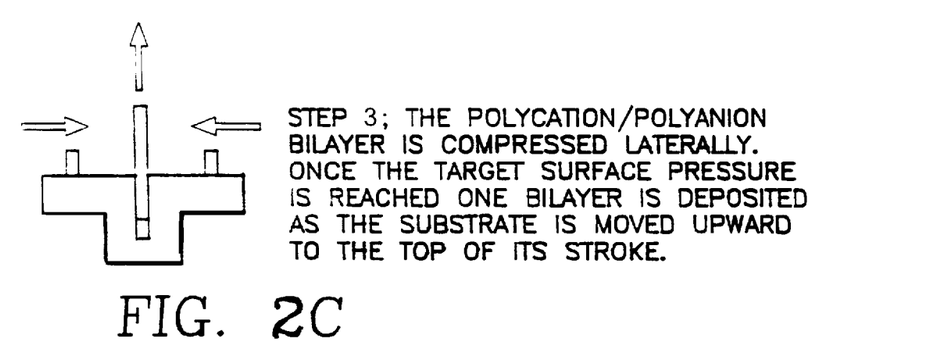
Figure 2D:
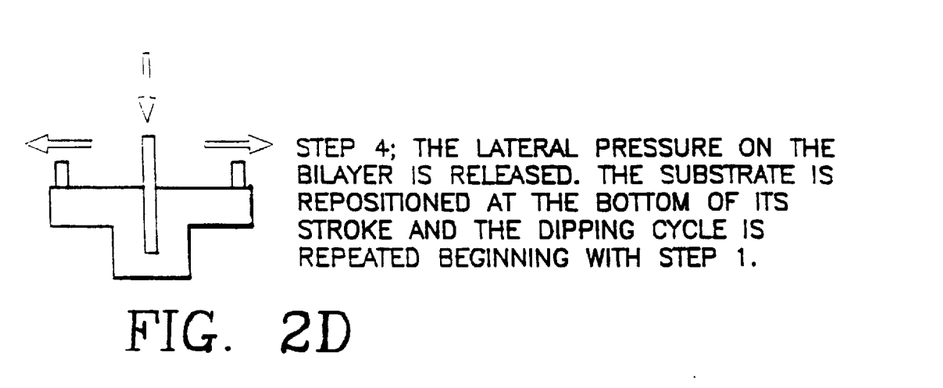

Referring to FIG. 2A, in step 1, the LB trough 1 is filled with aqueous 0.001M polyanion. The substrate 2 is positioned at the bottom of its stroke and the barriers are fully open. Referring to FIG. B, in step 2, a 0.5M organic or water soluble polycation is placed dropwise on the liquid surface and the solvent is allowed to evaporate. The polycation ionically bonds with the polycation at the argon/liquid interface. Referring to FIG. 2C, in step 3, the polycation bilayer is compressed laterally. Once the target surface pressure is reached, one bilayer is deposited as the substrate 2 is moved upward to the top if its stroke. Referring to FIG. 2D, in step 4, the lateral pressure on the bilayer is released. The substrate 2 is repositoned at the bottom of its stroke and the dipping cycle is repeated beginning with step 1.

Figure 3:
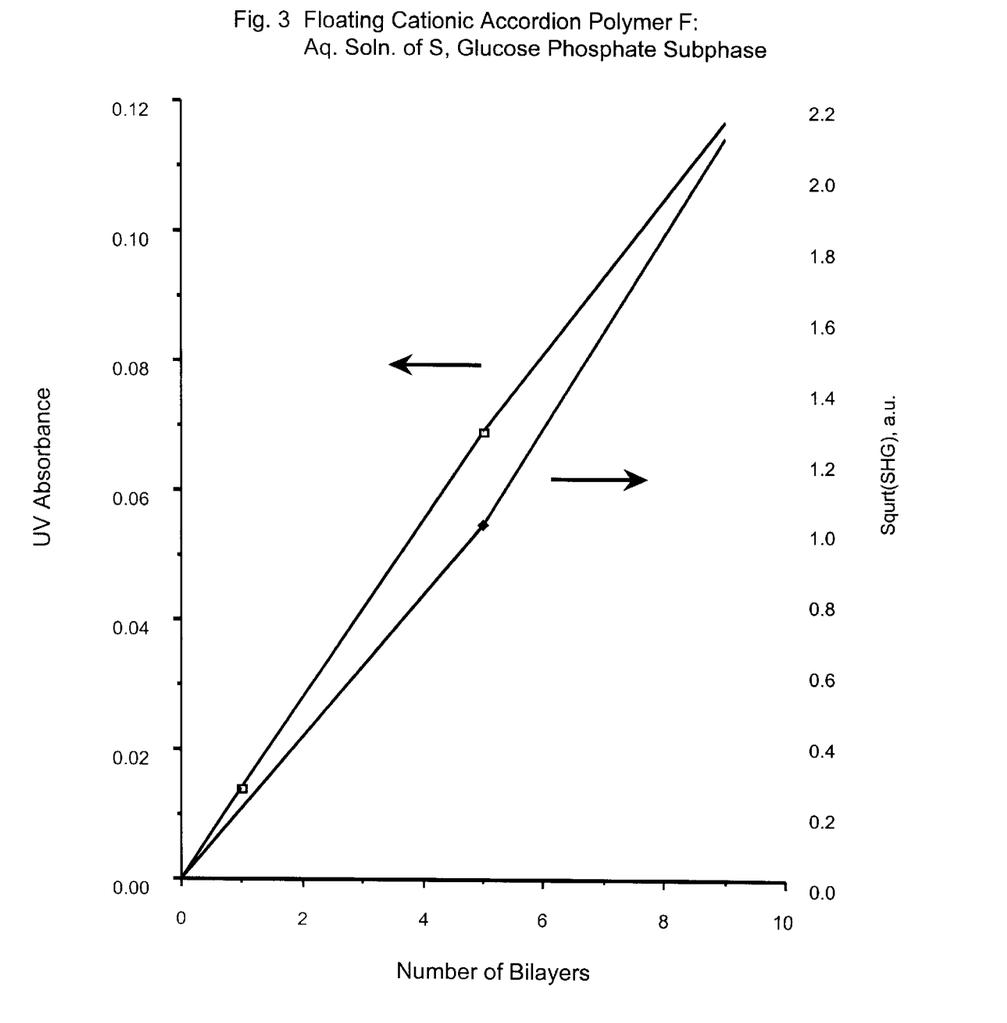
FIG. 3: Floating cationic accordion polymer F on an aqueous solution S, of glucose phosphate subphase.

EXAMPLE 3
UV-Visible Spectroscopy and Second Harmonic Generation Characterization of the Film The transmission UV-Vis spectra of the films were obtained with a Cary 5 NIR-Vis-UV spectrophotometer. The films were referenced to air, and the glass background was subtracted to obtain the film spectra (FIG. 3).

Second harmonic generation (SHG) measurements were made in transmission with an incident beam at 54° from normal. The SHG signal was generated by transmission of a fundamental beam from a Q-switched Nd:YAG laser (pulse width of 10 ns and repetition rate of 10 Hz) at an incident angle of 54° from normal. The SHG signal was detected with an intensified Si diode array (Tracor Northern) (FIG. 3).

EXAMPLE 4
Deposition of Polymer F/Glucose Phosphate Bilayers

LB films were made using a circular alternate layer trough (NIMA, Coventry). The trough was kept in a glove box continuously purged with nitrogen gas during the LB film depositions at 24° C. The substrates were 1"×3" glass slides (Fisher, Cat. # 12-550A) cleaned with $H_2SO_4/H_2O_2$. For dipping, the substrate was clamped to a slide holder such that material was deposited on only one side of the substrate. The trough was filled with the $10^{-3}$M solution of glucose phosphate disodium salt (Aldrich) (pH=5.5). A chloroform/pyridine (3:1) solution of polymer F was spread at the nitrogen/aqueous solution interface in one compartment of the alternate layer trough (The second compartment contained only the aqueous solution. That is, no polymer was spread in the second compartment; hereinafter referred to as the clean compartment). The system was allowed to equilibrate for 1 hour before the polymer film was compressed asymmetrically at a barrier speed of 10 $cm^2$/min to a surface pressure of 15 mN/m.

The film deposition was performed using the following procedure. The substrates were held in the nitrogen atmosphere during the equilibration and initial compression of the polymer film. Once the system reached the target surface pressure, the substrates were moved down into the aqueous subphase in the clean compartment. Film deposition occurred as the substrate was moved on the upstroke at 3 mm/min out of the first compartment. Subsequent bilayers were built up on the substrates by repeating this procedure.

The transmission UV-Vis spectra of the films were obtained with a Cary 5 NIR-Vis-UV spectrophotometer. The films were referenced to air and the glass background was subtracted to obtain the film spectra.

Second Harmonic Generation (SHG) measurements were made in transmission with an incident beam at 54° from normal. The SHG signal was generated by transmission of a fundamental beam from a Q-switched Nd:YAG laser (pulse width of 10 ns and repetition rate of 10 Hz) at an incident angle of 54° from normal. The SHG signal was detected with an intensified Si diode array (Tracor Northern).

Figure 4:
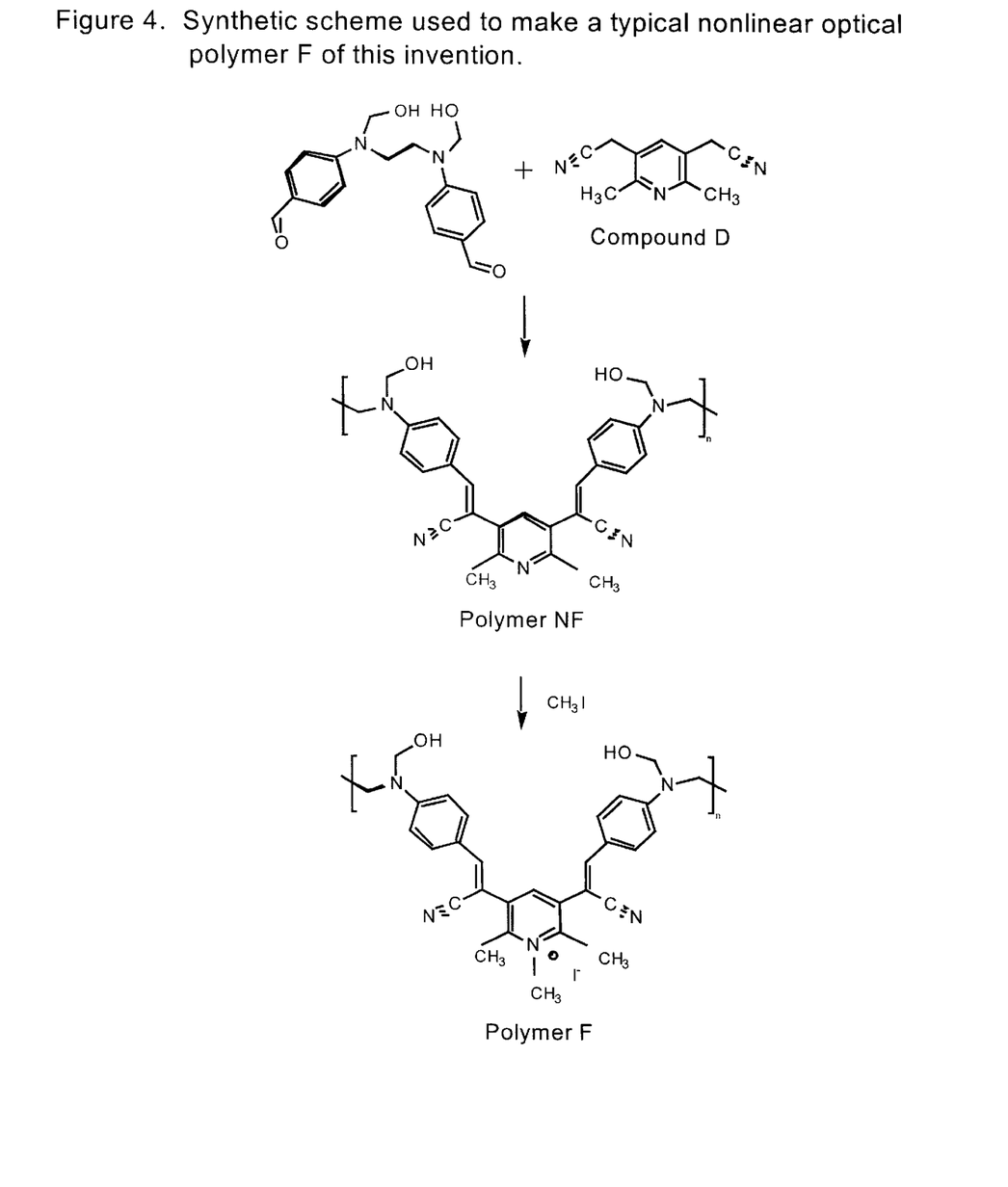
FIG. 4: Synthetic scheme used to make a typical nonlinear optical polymer F.

The UV absorbance and the SHG intensity as a function of films thickness are plotted in FIG. 4.

What is claimed is:

1. A polarized film, comprising: at least one molecular bilayer having the formula:

wherein:
n is the number of bilayers, is from 1 to 4000;
F is a semi-ionic mainchain, head-to-head chromophoric polymer which is represented by the formula:

which floats on a liquid subphase of a Langmuir-Blodgett trough and is essentially insoluble in said subphase during the film deposition process;
S is an ionic molecule having essentially no nonlinear optical properties and having the opposite charge of F, and said S is soluble in said subphase;
$B_{NFD}$ is a nonionic bridging group, extending between and being part of said electron donating ends of two $C_F$ chromophores;
$B_{IFA}$ is an ionic bridging group, extending between and being part of said electron accepting ends of two $C_F$ chromophores;
$C_F$ chromophores have an electron accepting group at one end (nearest $B_{IFA}$), and an electron donating group at the other end (nearest $B_{NFD}$), and a rigid group which contains delocalized p-electrons electronically connecting the electron accepting end and the electron donating end of said chromophores;

$y_F$ is the degree of polymerization of F, which ranges from a minimum value of 2 to a maximum value of about 300.

2. The polarized film of claim 1, wherein the cationic electron-accepting bridging groups ($B_{IFA}$) in polymer F, is independently selected from the group consisting of:

-continued wherein:
* designates a point of attachment between the bridging group and a rigid connecting group;
R is selected from the group consisting of methyl, ethyl, propyl, hydroxyethyl and benzyl;
$R_1$ is selected from the group consisting of hydrogen, methyl, ethyl, propyl and allyl; and
n and m are independently 2 or 3.

3. The polarized film of claim 1, wherein the anionic electron-accepting bridging groups ($B_{IFA}$) in polymer F is independently selected from the group consisting of:

-continued wherein:
* designates a point of attachment between the bridging group and a rigid connecting group;
R is selected from the group consisting of hydrogen, methyl, ethyl, propyl, allyl, hydroxyethyl and benzyl;
$R_1$ is hydrogen or methyl;
X is selected from the group consisting of sulphonate $(SO_3)^-$, carboxylate $(CO_2)^-$ and phosphonate $(PO_4)^{2-}$; and
n and m are independently 2 or 3.

4. The polarized film of claim 1 wherein the nonionic electron-donating bridging groups ($B_{NFD}$) in polymer F is independently selected from the group consisting of:

wherein:
* designates a point of attachment between the bridging group and a rigid connecting group;
R is selected from the group consisting of methyl, ethyl, propyl, allyl, hydroxyethyl and benzyl; and
$R_2$ is selected from the group consisting of hydrogen, hydroxyl, methoxyl, ethoxyl, acrylate, methacrylate and oxohydroxyethyl.

5. The polarized film of claim 1, wherein the rigid connecting groups of the chromophore, $C_F$, are independently selected from the group consisting of:

-continued

-continued wherein,

* designates a point of attachment between the bridging group and a rigid connecting group; and Z is independently chosen from the group consisting of thio ether (S), ether (O), or an amine (NH).

6. A method for making the polarized films of claim 3 comprising the steps of:

utilizing a Langmuir-Blodgett trough in which the subphase of said trough is an aqueous solution of S molecules;

spreading a non-aqueous solution of F on said subphase;

waiting about 1 to about 60 minutes for said molecular bilayer to form;

compressing said molecular bilayer with one or more moveable walls of said Langmuir-Blodgett trough while maintaining the surface pressure at the gas-liquid interface between 20% and 90% of the minimum pressure required to collapse said molecular bilayer film; and dipping, repeatedly, a substrate oriented between 0° and 90° with respect to the surface of the gas-liquid interface, through the aqueous-gas interface by a Z- or X-type deposition procedure until said multilayer film comprised of from 1 to about 4000 bilayers is achieved.

7. The polarized film of claim 1, wherein said F is cationic and said S molecule is glucose phosphate, 2,6-naphthalenedisulfonate, water-soluble organodisulfonates, water-soluble organodicarboxylates, water-soluble organophosphates, or polyanion-containing organic compounds.

8. The polarized film of claim 1, wherein said F is anionic and said S molecule is a water-soluble dialkyl bipyridinium or polycation-containing organic compounds.

9. A polarized film, comprising:

at least one molecular bilayer having the formula:

wherein:

n is the number of bilayers, is from one to 4000;

F' is a semi-ionic mainchain, head-to-head chromophoric polymer which is represented by the formula:

which during the manufacture of the film floats on a liquid subphase of a Langmuir-Blodgett trough and is essentially insoluble in said subphase;

S is an ionic molecule having essentially no nonlinear optical properties and having the opposite charge of F', and said S is soluble in said subphase;

$B_{NFA}$ is a nonionic bridging group, extending between and being part of said electron accepting ends of two $C_F$ chromophores;

$B_{IFD}$ is an ionic bridging group, extending between and being part of said electron donating ends of two $C_F$ chromophores;

$C_F$ is a chromophore of F', and wherein, said chromophore has an electron accepting group at one end (nearest $N_{NFA}$), and an electron donating group at the other end (nearest $N_{IFD}$), and a rigid group which contains delocalized p-electrons electronically connecting the electron accepting end and the electron donating end of said chromophores;

$y_F$ is the degree of polymerization of F', which ranges from a minimum value of 2 to a maximum value of about 300.

10. The polarized film of claim 9, wherein the nonionic electron-accepting bridging groups ($B_{NFA}$) in polymer F' is selected from the group consisting of:

-continued wherein:
* designates a point of attachment between the bridging group and a rigid connecting group;
R is selected from the group consisting of hydrogen, methyl, ethyl, propyl, allyl, hydroxymethyl, hydroxyethyl and benzyl; and
$R_2$ is selected from the group consisting of hydrogen, hydroxyl, methoxyl, ethoxyl, acrylate, methacrylate and oxohydroxyethyl.

11. The polarized film of claim 9, wherein the anionic electron-donating bridging groups ($B_{IFD}$) in polymer F' is selected from the group consisting of:

wherein:
* designates a point of attachment between the bridging group and a rigid connecting group;
R is selected from the group consisting of methyl, ethyl, propyl, allyl, hydroxyethyl and benzyl;

X is selected from the group consisting of sulphonate $(SO_3)^-$, carboxylate $(CO_2)^-$ and phosphonate $(PO_4)^{2-}$; and
n and m are independently 2 or 3.

12. The polarized film of claim 9, wherein the cationic electron-donating bridging groups ($B_{IFD}$) in polymer F' is selected from the group consisting of:

wherein:
* designates a point of attachment between the bridging group and a rigid connecting group;
R is selected from the group consisting of methyl, ethyl, propyl, allyl, hydroxyethyl and benzyl; and
n is 2 or 3.

13. A method for making the polar films of claim 9, comprising the steps of:
utilizing a Langmuir-Blodgett trough in which the subphase of said trough is an aqueous solution of S;
spreading a non-aqueous solution of said F' on said subphase;
waiting about 1 to 60 minutes for said molecular bilayer to form;
compressing said molecular bilayer with one or more moveable walls of said LB Langmuir-Blodgett trough while maintaining the surface pressure at the gas-liquid interface between 20% and 90% of the minimum pressure required to collapse said molecular bilayer film; and dipping, repeatedly, a substrate oriented between 0° and 90° with respect to the surface of the gas-liquid interface, through the aqueous-gas interface by the Z- or X-type deposition procedure until said multilayer film comprised of from 1 to about 4000 bilayers is achieved.

14. The polarized film of claim 9, wherein said F' is cationic and said S molecule is glucose phosphate, 2,6-naphthalenedisulfonate, water-soluble organodisulfonates, water-soluble organodicarboxylates, water-soluble organophosphates, or NLO-inactive polyanion-containing organic compounds.

15. The polarized film of claim 9, wherein said F' is anionic and said S molecule is an water-soluble dialkyl bipyridinium or NLO-inactive polycation-containing organic compounds.

16. The polarized film of claim 9, wherein the rigid connecting groups of the chromophore, $C_F$, are independently selected from the group consisting of:

wherein,
* \* designates a point of attachment between the bridging group and a rigid connecting group; and
* Z is independently chosen from the group consisting of thio ether (S), ether (0), or an amine (NH).

* * * * *